United States Patent [19]

Anderson

[11] Patent Number: 4,552,578

[45] Date of Patent: Nov. 12, 1985

[54] OPTICAL FIBER FABRICATION PROCESS COMPRISING DETERMINING MODE FIELD RADIUS AND CUT-OFF WAVELENGTH OF SINGLE MODE OPTICAL FIBERS

[75] Inventor: William T. Anderson, Lawrenceville, Ga.

[73] Assignee: AT&T Bell Laboratories, Murray Hill, N.J.

[21] Appl. No.: 494,891

[22] Filed: May 16, 1983

[51] Int. Cl.[4] .............................................. C03B 37/07
[52] U.S. Cl. ................................... 65/29; 65/DIG. 13
[58] Field of Search ........................ 65/2, 29, DIG. 13; 356/73.1; 364/473

[56] References Cited

U.S. PATENT DOCUMENTS 4,236,904  12/1980  Lazay ......................................... 65/2

FOREIGN PATENT DOCUMENTS 0098857  8/1978  Japan .................................. 356/73.1
0082032  6/1980  Japan .................................. 356/73.1

OTHER PUBLICATIONS

E. Brinkmeyer et al., "Applied Optics", vol. 21, No. 11, Jun. 1, 1982, pp. 1910–1915.
Y. Kato et al. "Electronics Letters", vol. 15, No. 14, Jul. 5, 1979, pp. 410–411.
A. K. Ghatak et al., "Electronics Letters", vol. 19, No. 3, Feb. 3, 1983, pp. 97–99.
V. A. Bhagavatula et al., "Electronics Letters", vol. 16, No. 18, Aug. 28, 1980, pp. 695–696.
A. R. Tynes et al., "J. Opt. Soc. of America", vol. 69, No. 11, Nov. 1979, pp. 1587–1596.
W. A. Gambling et al., "Microwaves, Optics, and Acoustics," vol. 1, No. 1, Sep. 1976, pp. 13–17.
J. Streckert, "Optics Letters", vol. 5, No. 12, Dec. 1980, pp. 505–506.
K. Hotate et al., "Applied Optics", vol. 18, No. 19, Oct. 1, 1979, pp. 3265–3271.
D. Marcuse, "Principals of Optical Fiber Measurements", 1981, pp. 317–322.
Y. Katsuyama, "Electronics Letters", Dec. 9, 1976, vol. 12, No. 25, pp. 669–670.
P. D. Lazay, "Symposium on Optical Fiber Measurement", Boulder, Co., 1980, pp. 93–95.
Y. Murakami, "Applied Optics", Apr. 1, 1979, vol. 18, No. 7, pp. 1101–1104.

*Primary Examiner*—S. Leon Bashore
*Assistant Examiner*—Michael K. Boyer
*Attorney, Agent, or Firm*—Eugen E. Pacher

[57] ABSTRACT

A single mode optical fiber manufacturing process can be monitored and/or controlled determining the mode field radius and/or the cut-off wavelength of fiber produced by the process, comparing these measured fiber parameter values to predetermined target values, and setting a process step in accordance with the result of the comparison. Both fiber parameters are determined by a procedure comprising measuring, as a function of angle, the far-field power emitted by a test fiber segment, and determining the parameters of a Gaussian function $G(\theta)$, typically by maximizing the value of an overlap integral.

4 Claims, 4 Drawing Figures

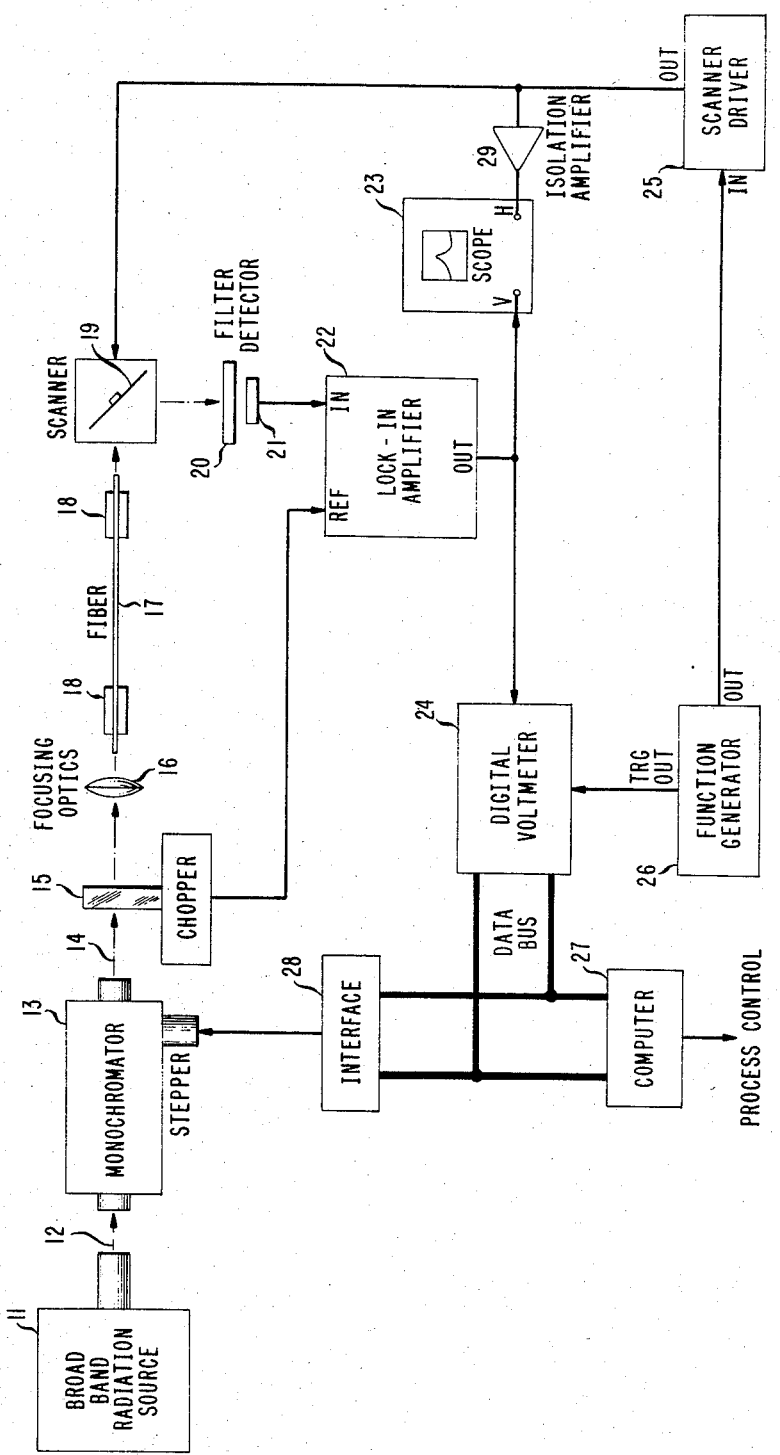

OPTICAL FIBER FABRICATION PROCESS COMPRISING DETERMINING MODE FIELD RADIUS AND CUT-OFF WAVELENGTH OF SINGLE MODE OPTICAL FIBERS

FIELD OF THE INVENTION

This invention pertains to measuring and testing methods for optical fiber fabrication.

BACKGROUND OF THE INVENTION

Information transmission systems that use optical fiber as the transmission medium are promising to become a very important and substantial part of the transmission network. Among optical fiber, single mode optical fiber assumes a prominent position because of its potentially extremely high carrying capacity. In order to meet the demanding specifications for optical fiber, and particularly for single mode optical fiber, it is typically necessary to monitor various fiber parameters, including fiber loss and bandwidth. In single mode fiber, two further parameters are of great importance, namely the cut-off wavelength of the first higher order mode and the single mode beam width, herein referred to as the "mode field radius" (MFR). The former is of importance because, inter alia, it determines the minimum operating wavelength of the fiber, and the latter because, inter alia, coupling loss may become large if fiber segments having different MFR are coupled together in multi-segment single mode fiber links. A general reference on optical fibers is *Optical Fiber Telecommunications*, S. E. Miller and A. G. Chynoweth, editors, Academic Press (1979).

The art knows several techniques for measuring the cut-off wavelength, but they generally fall into one of two classes. Techniques in the first class rely upon the fact that more optical power can be launched into an overfilled fiber core when higher-order modes can propagate than when only the fundamental mode propagates. Thus, a substantial decrease in the power transmitted through a fiber is observed at the cut-off wavelength. Such a measurement can be implemented in at least two ways. First, the loss of a fiber can be measured with and without a "mode-stripping" bend in the fiber, (e.g., an about one-inch diameter loop), and the wavelength above which the results of the two measurements converge can be identified. See, for instance, Y. Katsuyama et al, *Electronics Letters*, Vol. 12(25), pp. 669–670 (1976). Second, the amount of power launched into a short, e.g., about 1 meter long, fiber, whose loss is negligible, may be measured directly. See, for instance, the paper by P. D. Lazay in *Technical Digest, Symposium on Optical Fiber Measurements*, Boulder, Colorado, October 1980, pp. 93–95. Both these approaches have shortcomings. In the former technique there exists ambiguity as to whether the observed cut-off is the desired single mode transition, the technique is complicated by fiber loss and mode coupling, and is unsuited for measuring fibers of length greater than about 10 mm. The practice of the latter technique requires a high quality monochromator to yield a smooth launch spectrum. Such an instrument is costly and not well suited to function in a production environment.

The second class of cut-off wavelength measurement techniques uses measurement of the near- or far-field of a fiber. Since the fundamental mode and the higher order modes have substantially different near-field and far-field patterns, the presence of higher order modes can, in principle, be detected. The cut-off wavelength can then be identified as that wavelength above which no higher order mode is present. Measurement of the near-field pattern was proposed, inter alia, by Y. Murakami et al, *Applied Optics*, Vol. 18(7), pp. 1101–1105 (1979). Since near-field patterns are relatively difficult to measure, more emphasis has apparently been placed upon far-field methods. In particular, the minimum in the far-field pattern has been analyzed. A. R. Tynes et al (*Journal of the Optical Society of America*, Vol. 69(11), pp. 1587–1596 (1979)), and W. A. Gambling et al (*Microwaves, Optics, and Acoustics*, Vol. 1(1), pp. 13–17 (1976)) have analyzed the half-power points determined from the measured far-field amplitude. However, the former is not applicable to non-step-index fiber, and the latter yields the theoretical cut-off wavelength, not the effective cut-off.

The art also knows several techniques for determining the MFR of single mode fiber. For instance, one such technique requires focusing a greatly magnified image of the illuminated fiber core into a television vidicon (Y. Murakami et al, op. cit.). Another technique utilizes the sensitivity of splice loss to transverse offset of the coupled fibers to determine the spot size (J. Streckert, *Optics Letters*, Vol. 5(12), page 505 (1980)). Other techniques require measurement of the far-field radiation field, with computation of either core parameters or the near-field radiation distribution and index profile from the measured pattern. W. A. Gambling et al, *Microwaves, Optics, and Acoustics*, Vol. 1(1), pp. 13–17 (1976), and K. Hotate and P. Okoshi, *Applied Optics*, Vol. 18(19), page 3265 (1979), respectively. These techniques also appear to be subject to shortcomings. For instance, the near-field technique requires substantial instrumentation to reach acceptable sensitivity and furthermore, is subject to error due to the marginal linearity of infrared vidicons. The transverse offset technique typically suffers from calibration difficulties and is furthermore subject to end-separation errors that are difficult to control. And lastly, the prior art far-field techniques require a substantial amount of computation, and are therefore time-consuming. A general review of the field of fiber characterization can be found in D. Marcuse, *Principles of Optical Fiber Measurements*, Academic Press, 1981.

In view of the importance of routine measurement of MFR and cut-off wavelength for, inter alia, fiber manufacturing process control purposes, techniques for measuring these parameters which are suitable for implementation in a production environment, which are fairly rapid, relatively insensitive to operator skill, require only relatively unsophisticated equipment, and which give reliable results even on fibers having nonideal refractive index profiles, e.g., having a central dip and/or a rounded "step" profile, are of considerable practical importance. This application discloses such a method.

SUMMARY OF THE INVENTION

The instant manufacturing process comprises determining the MFR $\omega$ and/or the effective cut-off wavelength $\lambda_c$ of single mode fiber. The method for determining $\lambda_c$ comprises measuring, at a multiplicity of wavelengths, the far-field power distribution of radiation transmitted through an effective length of fiber, and determining the parameters of a Gaussian fitting function $G(\theta)$, at a multiplicity of wavelengths, by maximizing the value of an integral expression I, defined below. The far-field power is to be measured both when the fiber contains, and does not contain, a mode-stripping bend. The cut-off wavelength is then determined by comparing the values of the "beam angle" of $G(\theta)$, determined for both the "straight" and the "bent" fiber configuration, and by determining the wavelength above which the beam angle values are substantially identical in the two configurations. This wavelength is identified as the effective cut-off wavelength $\lambda_c$.

The method for determining the mode field radius $\omega$ of a single mode fiber comprises determining the far-field power distribution at a wavelength in the single mode regime of the fiber, determining $G(\theta)$ by maximizing I, and determining $\omega$ from the beam angle of $G(\theta)$.

The methods for determining $\lambda_c$ and $\omega$ can be practiced together or separately, and can advantageously be used to monitor and control the fiber manufacturing process, e.g., by comparing the measured $\lambda_c$ and/or $\omega$ to predetermined target values $\lambda_{co}$ and $\omega_o$, respectively, and setting a manufacturing step in accordance with the result of the comparison.

BRIEF DESCRIPTION OF THE DRAWINGS

FIG. 2 schematically depicts apparatus useful for determination of $\lambda_c$ and/or $\omega$ according to the invention;

DETAILED DESCRIPTION

Two salient aspects of the instant technique are its use of the far-field power distribution and of a Gaussian function that is fitted to the far-field power distribution by maximizing the value of an overlap integral.

As is well known, the radiation field in a waveguide, in particular, in an optical waveguide, i.e., a fiber, can be expressed in terms of radiation modes. Whether or not a certain mode can propagate in a fiber depends, for a particular fiber, on the wavelength of the radiation. The lowest order propagating mode $LP_{01}$ does not have a cut-off wavelength. On the other hand, the next higher mode, designated $LP_{11}$, can, according to theory, not propagate in step index fiber if $V<2.405$, where $V=ka(n_1^2-n_0^2)^{\frac{1}{2}}$. In this expression, $n_0$ and $n_1$ are the refractive indices of the cladding and the core, respectively, a is the core diameter, and k is the wave propagation constant in vacuum. The theoretical cut-off wavelength in this case is determined by $V=2.405$. However, it is observed in real fibers that the $LP_{11}$ mode ceases to propagate over macroscopic distances at a wavelength that is typically shorter than the theoretical cut-off wavelength. This wavelength is the effective cut-off wavelength $\lambda_c$.

The far-field radiation pattern, produced by a localized radiation source, that exists at distances from the source much greater than the radiation wavelength and source dimension, is the "far field". For the wavelengths of interest herein, typically between about 0.8 $\mu$m and about 1.6 $\mu$m, the far-field radiation distribution is well established at distances from the radiating fiber end greater than 1 mm. For practical purposes, however, the source-to-detector distance advantageously is chosen to be substantially greater than this, e.g. of the order of about 1 to 10 cm, to achieve appropriate angular resolution.

Figure 1:
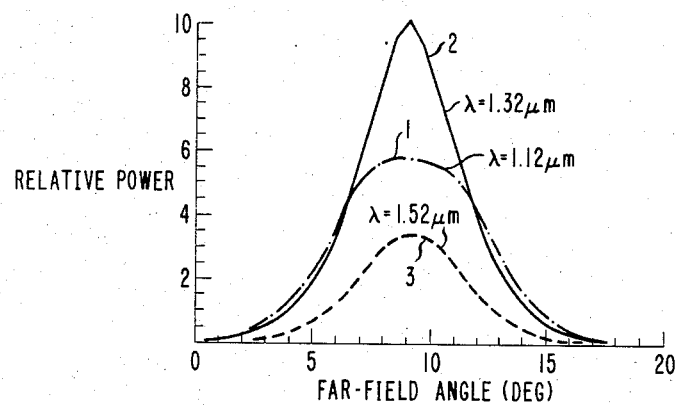
FIG. 1 shows exemplary experimentally determined curves of far-field power.

It is well known that the radial power distribution in the far-field regime changes drastically with wavelength near $\lambda_c$. This is illustrated by means of exemplary experimentally determined curves in FIG. 1. Curve 1 shows the relative power of radiation emitted from the end of a single mode fiber segment as a function of the far-field angle, at a wavelength much below $\lambda_c$; curve 2 shows the same for a wavelength close to, but still below, $\lambda_c$; curve 3 shows the same at a wavelength greater than $\lambda_c$.

Exemplary instrumentation for determining the far-field radiation power, as well as for carrying out some data processing, to be discussed below, on the measured data, is shown in FIG. 2. Broadband radiation source 11, e.g., a 100 watt tungsten-halogen lamp, produces radiation 12, which is imaged onto the input slit of grating monochromator 13. The monochromator is controlled by a stepper motor to permit automatic wavelength selection. Substantially monochromatic light 14 exiting the output slit is chopped by mechanical chopper 15 and focused onto the core of fiber 17 by means of focusing optics 16, e.g., a 20×0.4NA microscope objective. Use of such an objective assures excitation of all propagating modes in the fiber, since the NA of typical currently used single mode fibers is only of the order of 0.1. The fiber, of any length greater than about 1 meter, is held in place by means of fixtures 18. The far end of the fiber is positioned close to the axis of galvanometer scanner mirror 19, whose nominal position is at approximately 45 degrees from the axis of the fiber. Radiation detector 21, covered by infrared transmitting color glass filter 20 to block ambient light, is typically positioned several centimeters from the mirror. The detector, e.g., a 2-stage thermoelectrically cooled lead sulfide unit, advantageously is fitted with an aperture that is optimized for use in this application. I have found that a 1×4 millimeter aperture, arranged with its long dimension perpendicular to the scan direction, yields angular resolution sufficient for the practice of the method with apparatus such as shown in FIG. 2. However, in different instrumentation schemes it may be found advantageous to use different aperture geometries and/or dimensions. The output of 21 is AC-coupled to a lock-in amplifier for synchronous detection. A signal in phase with chopper 15 is fed to the reference input of 22. The analog output of 22 goes to digital voltmeter 24, e.g., a Hewlett-Packard 3437A system voltmeter, for digitization, and to the vertical input terminal of oscilloscope 23. The output of 24 is tied by means of a data bus, e.g., an IEEE-488 bus, to computer 27, e.g., an HP-85A desk top computer, and, through interface 28, to the stepper motor of 13. Function generator 26, e.g., a Tektronix FG501, supplies a ramp signal to scanner driver 25, the output of which activates scanner mirror 19, as well as being fed to isolation amplifier 29 and from there to the horizontal oscilloscope input. The function generator also provides a trigger signal to digital voltmeter 24 at the start of each scan, thereby triggering a burst of voltmeter readings. The voltmeter readings, which are proportional to the far-field power at various angular positions, are typically read by computer 27 and then processed, thereby producing an output which can be used to control the manufacturing process. The instrumentation of FIG. 2 can also perform signal averaging, thereby improving the signal-to-noise ratio of the measurement. For instance, it has been found advantageous to average several scans, typically about 10, before further data processing is commenced. It is to be understood that the instrumentation shown in FIG. 2 can be used for determining $\omega$ and/or $\lambda_c$, that the instrumentation shown is exemplary only, and that other instrumentation schemes can easily be devised.

Figure 3:
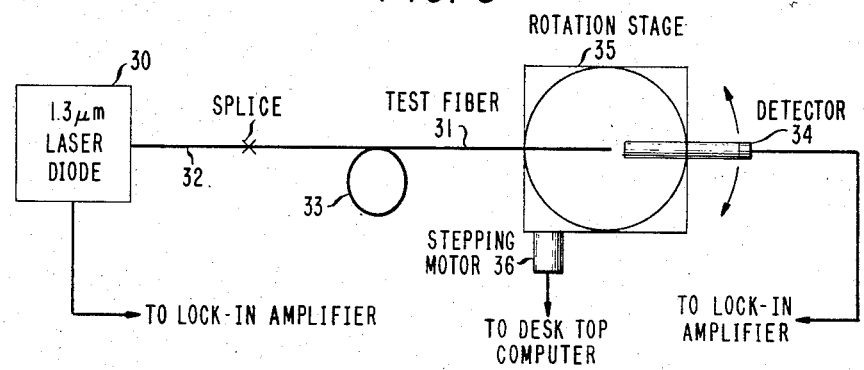
FIG. 3 shows further exemplary apparatus for the practice of the invention.

Further exemplary radiation source and detection instrumentation for determining the far-field power is shown in FIG. 3. Signal and data processing can be accomplished substantially as shown in FIG. 2. Pulsed coherent narrow-band radiation, e.g., 1.3 $\mu$m radiation emitted by laser diode 30, is coupled into test fiber 31 by means of a short length of fiber 32 coupled permanently to the laser diode and spliced or otherwise coupled to the input end of the test fiber. For determination of $\omega$ the fiber contains mode filter 33, typically about a 1 inch diameter loop. The output end of 31 is mounted on rotation stage 35 such that the fiber end substantially coincides with the rotation axis of the stage. Photon detector 34 comprising, for instance, a PIN detector, is also mounted on the rotation stage which is driven by stepping motor 36. The output of the detector can be fed to a lock-in amplifier, together with a reference signal in phase with the radiation pulses.

According to the invention, a Gaussian function is to be fitted to the measured far-field data. An appropriate Gaussian function is $G(\theta) = G_o \exp(-\theta^2/2\theta_\omega^2)$, where $G_o$ is the amplitude at $\theta = 0$, and $\theta_\omega$ is the "beam angle". A preferred approach is to first determine the field amplitude distribution $E_m(\theta)$ from the measured power distribution. This can typically be done, at least in the central lobe of the distribution, by taking the square root of the measured values. It will be appreciated that the power distribution is typically measured at discrete angles, and that therefore $E_m(\theta)$ is also determined for discrete values of $\theta$. The Gaussian function can be fitted to $E_m(\theta)$ by any appropriate curve-fitting technique, but maximizing the value of the overlap integral I, defined by equation 1 below, by varying $\theta_\omega$ is the preferred procedure.

$$I = \frac{\left[\int_o^\infty \theta G(\theta) E_m(\theta) d\theta\right]^2}{\int_o^\infty \theta G^2(\theta) d\theta \int_o^\infty \theta E_m^2(\theta) d\theta} \quad (1)$$

The integration is typically performed numerically. Methods for numerical integration are well known. Fitting the function $G(\theta)$ determines the beam angle $\theta_\omega$, and $\omega$ and/or $\lambda_c$ can be determined from $\theta_\omega$, as will now be described.

The MFR $\omega$ is preferably determined by measuring the far-field power distribution at a wavelength in the single mode regime of the test fiber, forming $E_m(\theta)$ as described above, fitting $G(\theta)$ thereto, and determining $\omega$ by means of Equation (2), wherein $\lambda$ is the radiation wavelength in vacuum.

$$\omega = \frac{\lambda}{2\pi \tan\theta_\omega} \quad (2)$$

To determine $\lambda_c$ by the instant method, it is necessary to measure the far-field power distribution as a function of wavelength, from a wavelength substantially below to a wavelength substantially above the expected $\lambda_c$. These measurements are typically made at a number of discrete wavelengths, for instance, at 20 nm intervals. Furthermore, it is necessary to make such measurements when the fiber is essentially bend-free, as well as when the fiber contains at least one mode-stripping bend. By a "mode-stripping" bend, I mean a bend in the fiber of sufficiently small radius of curvature to result in stripping of the $LP_{11}$ mode from the fiber. An exemplary mode-stripping bend is, for instance, a 1 cm radius loop. A fiber is substantially "bend-free" if it does not contain a bend effective for removing a substantial fraction of the $LP_{11}$ mode from the fiber. Typically, a fiber that does not contain bends having a radius of curvature less than about 10 cm is "substantially bend-free".

The preferred approach to determine $\lambda_c$ from the measured power distribution is to determine the function $E_m(\theta)$ for every measured power distribution, fitting a $G(\theta)$ to every $E_m(\theta)$, thereby determining the value of the beam angle $\theta_\omega$ at the wavelengths at which measurements were made, and for both the bent and the unbent fiber configurations. The beam angles $\omega$ are then formed from the thus determined $\theta_\omega$, e.g., by means of equation (2). The effective cut-off wavelength $\lambda_c$ is the wavelength above which the beam angles are substantially identical in the two fiber configurations.

Figure 4:
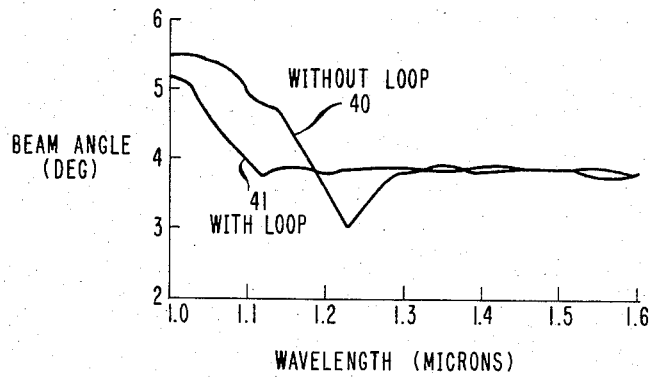
FIG. 4 shows exemplary curves of beam angle versus wavelength, as determined by the inventive method.

Exemplary results obtained by means of such a procedure are shown in FIG. 4. The measurements were taken on an approximately 3 meter segment of single mode fiber. Curve 40 shows the beam angle as a function of wavelength when the fiber was substantially straight, and curve 31 when the fiber contained a 1 inch diameter loop. The data shows that for wavelengths above about 1.3 $\mu$m, the beam angles (at any given wavelength) in both configurations are essentially identical, yielding $\lambda_c = 1.3$ $\mu$m.

The above-disclosed methods for determining $\lambda_c$ and $\omega$ can advantageously be used to control an optical fiber manufacturing process. Such processes typically comprise a multiplicity of steps, including preform deposition, fiber drawing, coating, grading, and cabling. Typically the value of $\omega$ (and/or $\lambda_c$) obtained by means of the disclosed method is compared to predetermined target values $\omega_o$ (and/or $\lambda_{co}$), and one or more manufacturing steps are set in accordance with the result of the comparison. "Setting" of a step is intended to include both adjustment of the step and unchanged maintenance of a step.

EXAMPLE 1

With apparatus substantially as shown in FIG. 3, the far-field power distribution of three MCVD-produced single mode fibers was measured, and $\omega$ determined therefrom. All fiber samples were about 2 m long and had $\lambda_c$ between 1.20 $\mu$m and 1.26 $\mu$m. Five measurements at 1.3 $\mu$m were made for each fiber, with new ends cleaved before each measurement. Each measurement comprised determination of the far-field power (source/detector distance about 10 cm) at 25 points, with $\frac{1}{2}$ degree angular spacing between points. The InGaAs detector had a 1 mm diameter aperture. A Gaussian function was fitted to $E_m(\theta)$ by varying $\theta_\omega$ to maximize the integral expression of equation 1, and $\omega$ determined by means of equation 2. The results are summarized in Table I.

TABLE I

| Fiber 1 | $\omega$ = 3.659 ± .035 $\mu$m |
|---|---|
| Fiber 2 | 3.341 ± .013 $\mu$m |

TABLE I-continued

| Fiber 3 | 3.281 ± .006 μm |
| --- | --- |

EXAMPLE 2

The $LP_{11}$ cut-off wavelengths $\lambda_c$ of two phosphosilicate-clad, germanosilicate core, single mode fibers, each of about 3 m length, were determined with apparatus substantially as shown in FIG. 2. The far-field power was measured at 0.5 degree intervals. The measurement results were qualitatively similar to those shown in FIG. 1. Such data was taken at 0.02 μm intervals over the wavelength range from about 1.0 μm to about 1.5 μm. From the measurement data of power versus far-field angles, the beam angles were determined by a procedure substantially as described above. The results of this were qualitatively similar to those shown in FIG. 4, with the beam angles with and without loop being substantially identical for wavelengths above 1.40 μm in one fiber, and above 1.28 μm in the other fiber, yielding $\lambda_c$ of 1.40 μm and 1.28 μm, respectively.

EXAMPLE 3

$\lambda_c$ and $\omega$ at 1.3 μm of a 1 m and a 1 km length of standard single mode fiber are determined using apparatus substantially as shown in FIG. 2 and using a method substantially as described above, by measuring the far-field power distributions as a function of angle at ½ degree intervals, over the spectral range from about 1.0 μm to about 1.5 μm, at about 0.02 μm intervals in wavelength.

EXAMPLE 4

$\lambda_c$ and $\omega$ of a 1 km section of standard single mode fiber are determined before and after cabling of the fiber, using apparatus substantially as shown in FIG. 2, and a method substantially as described above. $\lambda_c$ is found to be 1.06 μm and 0.98 μm before and after cabling, respectively, and $\omega$ is 3.9 μm both before and after cabling.

EXAMPLE 5

$\omega$ of a 3 section of standard single mode fiber is determined as described above, and found to be smaller than the pre-determined target value $\omega_o$ by about 10%. In response thereto, the index difference in subsequent fiber preforms is reduced by about 15% by reducing the concentration of Ge in the core region.

What is claimed is:

1. Single mode optical fiber manufacturing process comprising a multiplicity of manufacturing steps including forming a first optical fiber preform, drawing first fiber from the first preform and grading of the draw fiber, the process further comprising determining the mode field radius $\omega$ for radiation of wavelength $\lambda_o$ of a segment of the first fiber, $\lambda_o$ being a wavelength in the single mode regime of the segment of fiber, the fiber segment having a first and a second end and being of length effective to produce steady-state propagating conditions at the second end for radiation of wavelength $\lambda_o$ launched into the first end;

comparing $\omega$ to a predetermined target value of the mode field radius; and setting at least one of the manufacturing steps in the manufacture of the first fiber, setting of at least one of the manufacturing steps for the subsequent production of another optical fiber, in accordance with the result of the comparison between $\omega$ and the target value;

the mode field radius $\omega$ determined by a method comprising (a) coupling substantially monochromatic measurement radiation of wavelength $\lambda_o$ into the first end of the fiber segment in a manner effective for launching the fundamental mode $LP_{01}$, (b) measuring, as a function of a far-field angle $\theta$, the radiation power at a multiplicity of values of $\theta$ in at least part of the central lobe of the far-field radiation field of the radiation emitted from the second end of said first fiber fiber end, the set of measured values of radiation power to be referred to as the radiation power distribution, (c) fitting a Gaussian function $G(\theta)$ to the radiation power distribution, or to a distribution derived from the radiation power distribution, and (d) determining $\omega$ from the fitted $G(\theta)$.

2. Single mode optical fiber manufacturing process comprising a multiplicity of manufacturing steps including forming an optical fiber preform, drawing first fiber from the preform, and grading of the drawn fiber, the process further comprising determining an actual cut-off wavelength $\lambda_c$ of a segment of the first fiber, where $\lambda_c$ is the actual cut-off wavelength of the $LP_{11}$ mode of electromagnetic radiation propagating axially through the segment of fiber, the fiber segment having a first and a second end and having a length effective to produce steady-state propagation conditions at the second end for electromagnetic radiation launched into the first end and propagating axially through the segment;

comparing $\lambda_c$ to a predetermined target value; and setting at least one of the manufacturing steps in the manufacture of the first fiber, or setting at least one of the manufacturing steps for the subsequent production of another optical fiber, in accordance with the result of the comparison between $\lambda_c$ and the target value; the actual cut-off wavelength $\lambda_c$ determined by a method comprising (a) coupling substantially monochromatic measurement radiation of a first wavelength $\lambda$ into the first end of the segment in a manner effective for launching at least one propating mode of radiation, (b) measuring, as a function of a far-field angle $\theta$, the radiation power at a multiplicity of values of $\theta$ in at least a part of the central lobe of the far-field radiation field of the radiation emitted from the second fiber end, the set of measured values of radiation power to be referred to as the radiation power distribution at said $\lambda$, (c) fitting a Gaussian function $G_\lambda(\theta)$ to the radiation power distribution at said $\lambda$, or to a distribution derived from the radiation power distribution at said $\lambda$, (d) repeating steps (a), (b), and (c), at a multiplicity of radiation wavelengths different from the first wavelength, the wavelengths spanning a wavelength range that includes $\lambda_c$, (e) the steps (a), (b), (c) and (d) to be carried out on the fiber segment free of mode-stripping bends, and also on the fiber segment containing at least one mode-stripping bend, thereby determining a multiplicity of fitted Gaussian functions, and (f) determining $\lambda_c$ of the fiber segment from the multiplicity of said fitted Gaussian functions.

3. Process of claim 1, further comprising determining the mode field radius $\omega$ for radiation of wavelength $\lambda_o$ of the segment of the first fiber, $\lambda_o$ being a wavelength in the single mode regime of the segment of the first fiber, the method for determining $\omega$ comprising
 (a) coupling substantially monochromatic radiation of wavelength $\lambda_o$ into the first end of the first fiber segment in a manner effective for launching the fundamental mode $IP_{01}$,
 (b) measuring the radiation power distribution at the wavelength $\lambda_o$,
 (c) fitting a Gaussian function $G_{\lambda_o}(\theta)$ to the radiation power distribution at $\lambda_o$, or to a distribution derived from the radiation power distribution at $\lambda_o$, and
 (d) determining $\omega$ from the fitted $G_{\lambda_o}(\theta)$, and the manufacturing process further comprises
 (e) comparing $\omega$ to a predetermined target value of the beam spot size.

4. Process of claim 3, wherein the fiber is adapted to transmit signal radiation of a wavelength between about 0.8 $\mu$m and about 1.6 $\mu$m, the segment is at least about 1 m long, the fiber segment in the "bend-free" condition does not contain any bends of radius of curvature less than about 5 cm, the amplitude of the far-field radiation field is measured at a distance from the second end of said first fiber greater than about 1 cm, and the Gaussian functions are fitted by a procedure comprising maximizing the value of a function I defined by the expression $$I = [\int_o^\infty \theta G(\theta) E_m(\theta) d\theta]^2 [\int_o^\infty \theta G^2(\theta) d\theta \int_o^\infty \theta E_m^2(\theta) d\theta]^{-1},$$

wherein $E_m(\theta)$ is a distribution derived from the radiation power distribution by taking the square root of the values of the radiation power distribution.

* * * * *